Dec. 20, 1966  W. S. TSUCHIYA ET AL  3,292,714
WHEEL TYPE OFFSET DISK HARROW
Original Filed July 1, 1963  4 Sheets-Sheet 1

FIG. 1

INVENTORS.
WILLIAM S. TSUCHIYA
EDWIN F. WADELTON
DAVID W. CAYTON
BY
John C. Thompson
ATTORNEY Dec. 20, 1966   W. S. TSUCHIYA ET AL   3,292,714
WHEEL TYPE OFFSET DISK HARROW
Original Filed July 1, 1963   4 Sheets-Sheet 2

INVENTORS.
WILLIAM S. TSUCHIYA
EDWIN F. WADELTON
DAVID W. CAYTON
BY

ATTORNEY

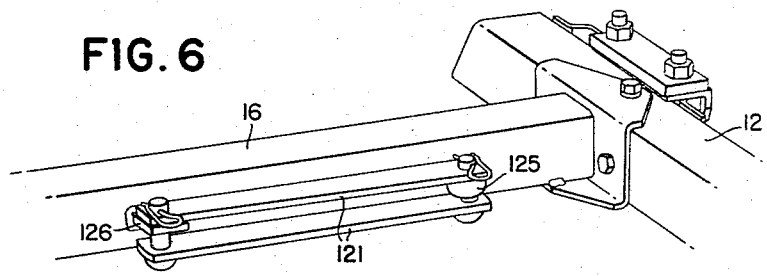
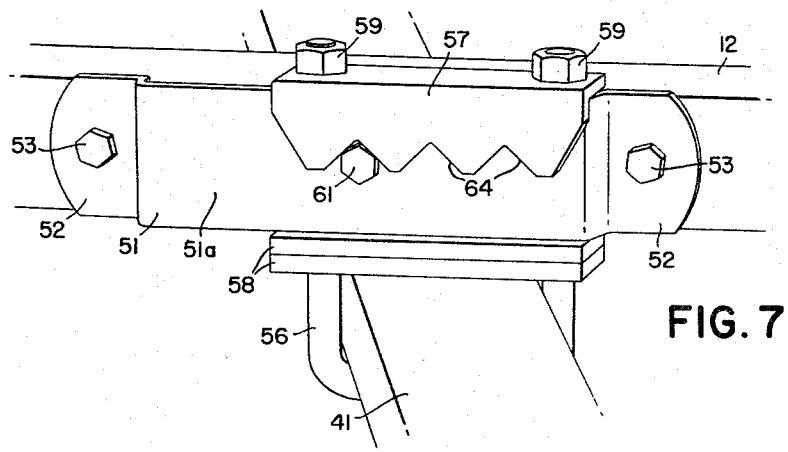
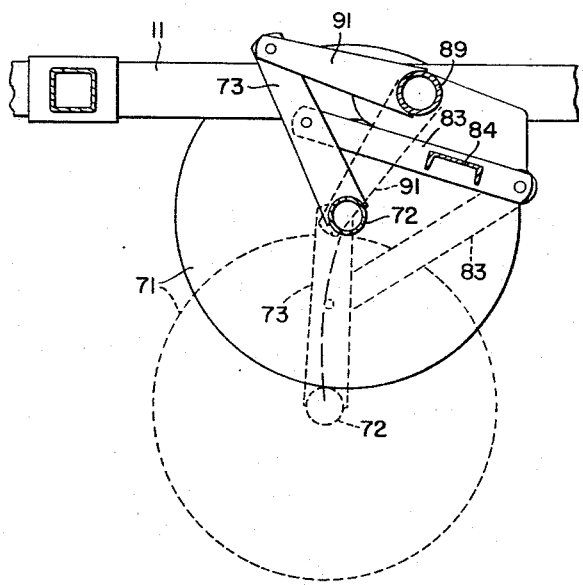

3,292,714
WHEEL TYPE OFFSET DISK HARROW
William S. Tsuchiya and Edwin F. Wadelton, Los Angeles, and David W. Cayton, Whittier, Calif., assignors to Deere & Company, Moline, Ill., a corporation of Illinois
Original application July 1, 1963, Ser. No. 291,828. Divided and this application Nov. 27, 1964, Ser. No. 422,877
2 Claims. (Cl. 172—583)

This is a division of application Serial No. 291,828, filed July 1, 1963, now abandoned.

The present invention relates generally to agricultural implements and more particularly to ground-working implements of the disk harrow type.

The object and general nature of this invention is the provision of a new and improved offset disk harrow having ground-engaging wheels disposed between the fore-and-aft spaced disk gangs and connected with the main frame of the harrow so that the ground-engaging wheels move substantially vertically relative to the harrow frame so as to maintain the proper balance in a fore-and-aft direction, both when the harrow is in a working position with the wheels serving as means to gauge the depth of operation, and when the harrow is in transport with the frame and disk gangs carried in an elevated position.

A further feature of this invention is the provision of a connection between the ground wheel mounting means and the front hitch member whereby the front end of the hitch member is raised and lowered in substantially constant relation with respect to the raising and lowering of the ground wheels.

A further novel feature of this invention is the provision of new and improved means connecting the gang frames with the main frame of the harrow in a manner facilitating shifting the gang relative to the main frame for changing the lateral position of the gang frames relative to the main frame and for changing the cutting angle of the gangs.

A further feature of this invention is the provision of novel means for adjusting the front hitch member laterally.

Another object of this invention is the provision of means to provide for level front gang penetration in conditions of high thrust.

Another object of this invention is to provide means for lowering the left portion of the rear gang to have it throw more dirt for a better furrow-filling job.

These and other objects and advantages of this invention will be apparent to those skilled in the art after a consideration of the following detailed description, taken in conjunction with the accompanying drawings in which the preferred form of this invention is illustrated.

FIG. 1 is a perspective view of an offset disk harrow in which the principles of this invention have been incorporated, the harrow being shown in its transport position.

FIG. 6 is a detail view illustrating the transport links in their storage position.

FIG. 7 shows the leveling blocks in their leveling position.

FIG. 8 is a somewhat diagrammatic view illustrating the movement of the ground-engaging wheel from its transport position to its working position.

Figure 2:
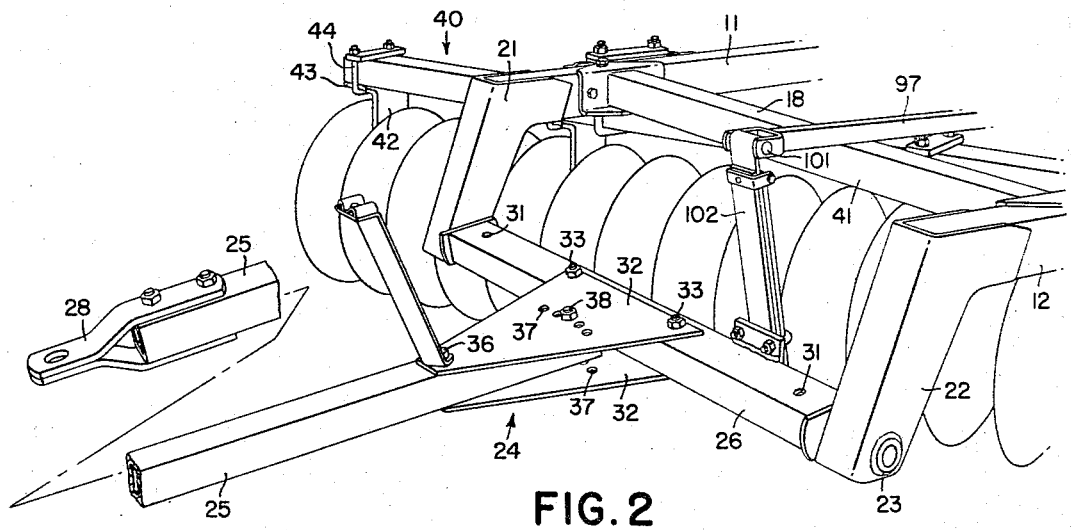
FIG. 2 is an enlarged perspective view of the harrow hitch illustrated in FIG. 1.

In the following description, right-hand and left-hand references are determined by standing at the rear of the disk harrow and facing the direction of travel.

Referring first to FIG. 1, the main frame of the disk harrow is indicated in its entirety by the reference numeral 10 and comprises a right-hand tubular bar 11 and a left-hand tubular bar 12. Fixed to the frame by means described below are front and rear disk gangs indicated at 13 and 14, respectively, arranged in diverging relation. To accommodate the diverging disk gangs, the right-hand frame bar 11 extends somewhat further to the rear than the left-hand frame bar 12. The frame bars 11 and 12 are rigidly interconnected by cross members 16, 17 and 18, the ends of which are fixed in any suitable manner to the fore-and-aft extending bars 11 and 12. The forward ends of the bars 11 and 12 are formed with or carry downwardly extending hitch brackets 21 and 22 disposed in lateral registry. The lowermost ends of the brackets 21 and 22 carry transverse tubular bushings or bearing sleeves 23 for rockably receiving the hitch member 24. The latter comprises a generally fore-and-aft extending tongue 25, preferably in the form of a tubular bar, the rear end of which is connected with a cross member 26 formed with outwardly extending trunnions 27 that are rockably received in the bushings 23, and the forward end of which is provided with a clevis 28 (FIG. 2).

As can be seen from FIG. 2, the transverse hitch member 26 is provided along its length with a plurality of pairs of registering apertures 31 and the rear end of the hitch bar 25 is rigidly connected to the transverse bar 26 by means of a pair of upper and lower tongue plates 32 having, along their rear edges, apertures adapted to register with selected pairs of apertures 31 and to be fixed to the transverse bar 26 by bolts 33. The apertures 31 are so placed that the tongue 25 may be connected to the central portion of the bar 26 or to the right portion or left portion, as desired. Also, the tongue member 25 may be fixed to the tongue plates 32 in different positions, by virtue of a forward bolt member 36 that is passed through forward registering openings in the plates 32 and the tongue member 25 and a set of rearward arcuately arranged openings 37 formed in the upper and lower plates 32 adapted to receive a bolt 38 that extends through the openings 37 and also through an opening (not shown) in the rear end of the tongue 25.

By virtue of the arrangement just described, the hitch tongue 25 may be disposed in a central fore-and-aft extending position or in a right-hand or left-hand offset position, either by moving the hitch plates 32 on the transverse hitch bar 26 or by moving the hitch tongue 25 within the hitch plates, or both.

The disc gangs 13 and 14 are arranged in laterally diverging arrangement, as is common in this type of implement. Each gang includes a gang frame 40 (FIG. 1) that is made up of a rectangular bar 41 carrying at spaced points along the bar a plurality of bearing brackets 42. Each of the brackets includes a laterally directed section 43 that is adapted to receive an associated U-bolt 44 that encircles the associated frame bar 41 and, when clamped thereto, the bearing brackets 42 becomes a rigid part of the gang frame 40.

Figure 3:
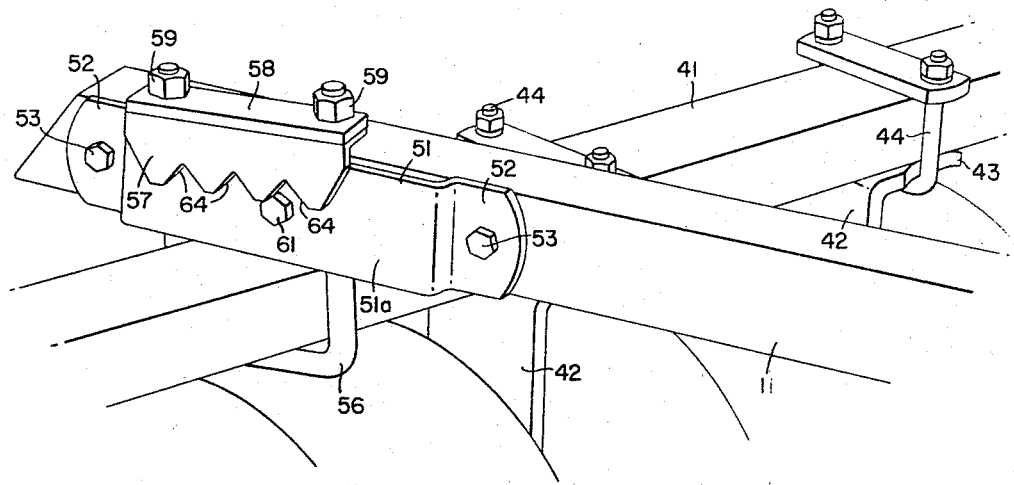
FIG. 3 is a perspective view of the means for adjustably fixing the gang frames to the main frame.

The front and rear portions of the main frame bars 11 and 12 overlie the associated gang frames 40, as best shown in FIG. 1, and means are provided for adjustably securing each gang frame to the associated main frame bars 11 and 12. Four adjustable securing means are employed and each includes a clamp plate 51 which is fixed to the outer side of each end of each of the main frame bars 11 and 12, each clamp plate 51, as best seen in FIG. 3, including offset ends 52 apertured to receive fasteners 53 fixing each clamp plate in place with the central portion 51a thereof spaced from the outer face of the associated portion of the frame bar so as to receive the legs of a U-bolt 56 therebetween. The U-bolt 56 embraces the associated gang frame bar 41 with the ends of the U-bolt 56 extending upwardly through the space between the clamp plate section 51a and the frame bar. The upper ends of the U-bolt are threaded and extend through a U-bolt cap 57 and an associated leveling block 58, also apertured to receive the U-bolt ends. When the nuts 59 on the end of each U-bolt are tightened, the several parts are securely fixed in rigid relation, but when the U-bolts are loosened, the gang frames may be shifted laterally relative to the main frame, and also the frames may be shifted fore-and-aft to a limited extent, determined by the fore-and-aft length of the space between the clamp plate sections 51a and the associated main frame bar. Thus, each clamp plate 51, the associated U-bolt 56 and other parts may be referred to as an angle selector whereby the cutting angle of each disk gang can be increased or decreased, as desired.

The correct spacing between the clamp plate section 51a and the associated portion of the frame bar is maintained by means of a bolt 61 that extends through each clamp plate 51 and the associated frame bar and a spacer (not shown) is disposed about the bolt 61 and between the clamp plate and the frame bar. Each bolt 61, operating in connection with a plurality of notches 64 formed in the depending flange of the U-bolt cap 57, serves as angle-indicating means, the notched portion cooperating with the associated bolt 61 to indicate one of the three possible angle settings. Each notched setting will increase or decrease the cutting angle of the associated gang approximately one and one half degrees. Thus the gang frame can be adjusted laterally and be shifted fore-and-aft by raising the gang frames out of engagement with the ground in a manner that will be pointed out below, and by loosening the U-bolts.

Disposed underneath the frame bars 11 and 12 substantially midway between the front and rear gangs 13 and 14 is a pair of laterally spaced apart ground wheels 71 journalled on a transverse axle member 72. According to this invention, wheel mounting means is provided, connecting the ground wheels 71 for substantially vertical adjustment relative to the main frame 10, so as to retain the desired balance between the ground wheels and the gangs, in respect to whether the wheels are moved up and down for gauging the working depth of the disks or for raising and lowering the disk harrow into and out of transport position. The wheel mounting means will now be described.

Fixed to the axle member 72 is a pair of generally upwardly extending arms 73. The main frame bars 11 and 12 carry a pair of brackets 75, each of which is rigidly fixed to the associated frame bar by a pair of vertical bolts 76 and transverse bolts 77. Each bracket 75 includes a generally downwardly and rearwardly extending bracket section 79. A pivot member 81 carried by the lower rear portion of each bracket 75 receives an associated arm 83, the arms being rigidly interconnected by a cross member 84 so that the arms 83 may be swung upward and downwardly together as a unit. The forward ends of the two arms 83 are connected by suitable pivot means 85 to the standards 73 at points well above the associated axle member 72. The forward upper portion of each of the wheel mounting brackets 75 is provided with a laterally inwardly extending hub (not shown) that serves as a journal receiving the end of a lift axle 89 extending between the associated frame bars 11 and 12. Arms 91 are fixed to the end portions of the lift axle 89 and extend generally downwardly and forwardly in forwardly converging relation with respect to the lower arms 83. The forward ends of the two upper arms 91 are connected to the upper portions of the wheel axle standards 73 by suitable pivot members 93.

As can be seen from FIG. 8, by virtue of the wheel mounting means described above, the ground wheels will move through a substantially vertical path when moving from either a transport position or a gauging position to the other of said positions, thus maintaining the harrow in substantial balance about the ground-engaging wheels.

Figure 5:
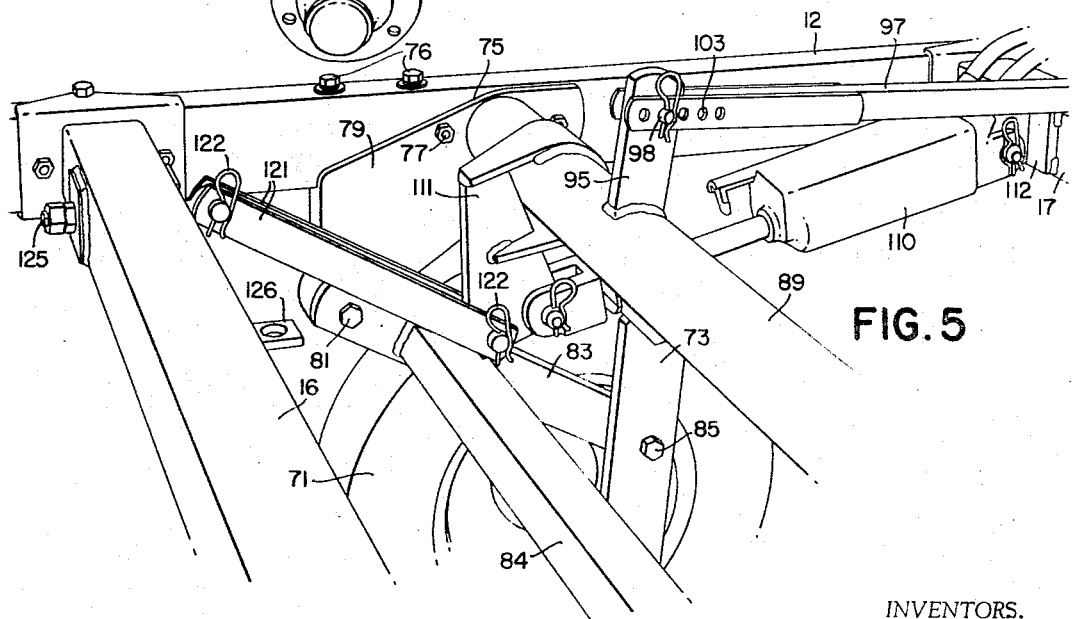
FIG. 5 is a detail view illustrating the means for holding the harrow in its transport position.

To accommodate different heights of drawbars and maintain level operation, means is provided to vertically adjust the tongue 25. To accomplish this vertical adjustment an apertured actuating arm 95 (FIG. 5) is fixed rigidly, as by welding, to the lift axle 89 and a lift bar 97, which is generally parallel to the main frame bars 11, 12, is connected at its rear end by a detachable pin 98 with the arm 95. The forward end of the lift link is pivotally connected, as at 101, (FIG. 1), with the upper end of a spring arm 102 which is fixed at its lower end to the rear side of the transverse hitch bar 26. The rear portion of the fore-and-aft extending link 97 is provided with a plurality of apertures 103 so that the pin 98 may be connected to the link in any one of several points whereby the relationship between the hitch 24 and the ground wheels 71 may be varied so as to provide for securing equal penetration of the front and rear gangs or for transferring weight from the front gang to the rear gang, or vice versa, as may be required by different operating conditions. The primary function of the adjustment at the rear end of the lift bar or link 97 is to keep the main frame level notwithstanding different heights of the tractor drawbar to which the forward end of the hitch bar or tongue 25 is connected.

Figure 4:
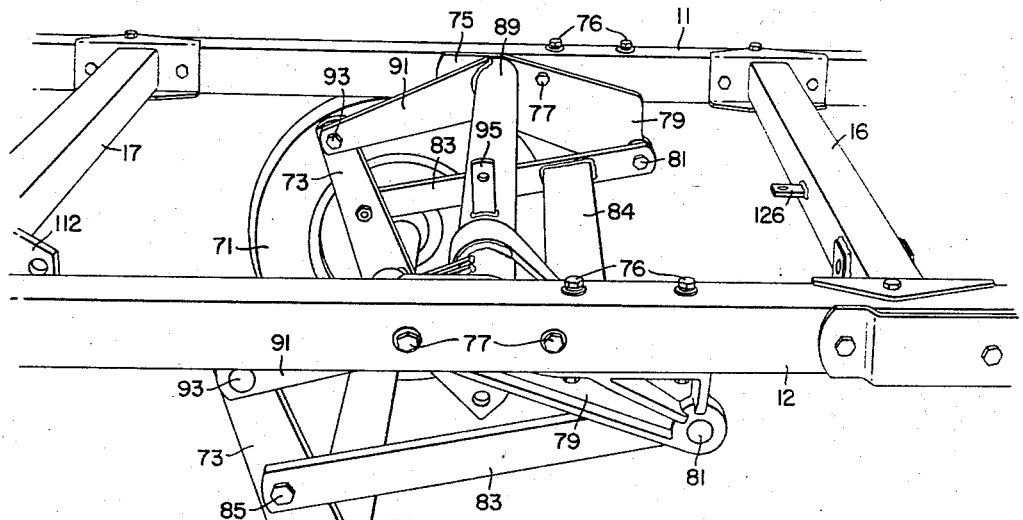
FIG. 4 is a view illustrating the means by which the ground-engaging wheels are secured to the main frame.

Power for raising and lowering the ground wheels 71 is derived from a hydraulic cylinder 110 connected between the forward apertured portion of an arm 111 extending downwardly from the lift axle 89 and a forward connection 112 (FIGS. 4 and 5) with the adjacent cross member 17. The cylinder is connected by suitable hose lines with a source of hydraulic power on the tractor to which the implement is connected.

A pair of transport links 121 may be connected between the rear cross member 16 and the rear portion of the lift axle arm 111, connections being made through quick detachable pins 122 whereby when the disk harrow is to be transported the transport links 121 are connected so as to relieve the cylinder 110. In fact, the parts are so constructed and arranged that the cylinder 110 may readily be disconnected under such circumstances. The rear end of the transport links 121 are connected with the cross member 16 through eye bolt means 125. When the transport links are in their idle position the eye bolt may be turned 90° and the transport links may be swung laterally into a position to be connected for storage to an apertured lug 126 on the frame 10, as best shown in FIG. 6.

In order to level the disk gangs laterally in certain conditions we provide a plurality of leveling blocks 58, serving in the nature of shims. Normally the leveling blocks 58 are carried in their storage position above the U-bolt caps 57, as best illustrated in FIG. 3, in which position the blocks 58 serve no leveling function. However in conditions of high thrust where the leading end of each gang tends to dig in deeper than the rear end it may be desirable to lower the rear end of each gang relative to the frame to provide more uniform penetration. Thus, one or two leveling blocks, as illustrated in FIG. 7, may be disposed between the main frame bars 11 and 12 and the rear end of each of the gang frames 41 to force the rear ends downwardly to secure more even penetration. Also the leveling blocks may be employed at the left portion of the rear gang to have the rear gang throw more dirt for a better furrow-filling job.

While we have been shown and described above the preferred structure in which the principles of the present invention have been incorporated, it is to be understood that our invention is not to be limited to the particular details, shown and described above, but that, in fact, widely different means may be employed in the practice of the broader aspects of our invention.

What we claim, therefore, and desire to secure by Letters Patent is:

1. An offset disk harrow comprising: a generally fore-and-aft extending main frame means, said frame means including laterally spaced apart fore-and-aft extending frame bars overlying a pair of disk gangs arranged in laterally diverging relation, said pair of disk gangs each including gang frame means, and means adjustably fixing each of said gang frame means to said first-mentioned frame means comprising a longitudinally extending generally U-shaped clamp plate having front and rear out-turned leg portions fixed to said frame bars, the bight portion of each plate being spaced from the associated frame bar to provide a U-bolt receiving space, transversely projecting lug means carried by said first-mentioned frame means, a U-bolt encircling each end portion of each gang frame means from below and having end portions extending upwardly between the bight of the associated clamp plate and the adjacent side of the associated frame bar to points above the frame bar, a U-bolt cap apertured to receive the ends of each U-bolt and overlying the associated clamp plate and frame bar, and fasteners on said U-bolts acting against each U-bolt cap for clamping the gang frame means to said frame bars, each of said U-bolt caps being provided with a downwardly depending portion having a plurality of notches cooperable with said transversely projecting lug means to hold said gang frames in selected positions of fore-and-aft adjustment, the parts being so arranged and constructed that when the fasteners are loosened the gang frame means may be moved to new positions of lateral and/or fore-and-aft adjustment relative to said main frame means.

2. The harrow set forth in claim 1 in which leveling blocks are disposed between said first-mentioned frame means and the rear end portions of said gang frame means to force the rear ends of the gang frame means downwardly to secure more even penetration in high thrust conditions.

References Cited by the Examiner
UNITED STATES PATENTS

| | | | |
|---|---|---|---|
| 396,895 | 1/1889 | Rose | 172—600 X |
| 1,084,494 | 1/1914 | Serlachius | 172—596 |
| 2,869,305 | 1/1959 | Murray | 172—328 |
| 2,952,325 | 9/1960 | Toland | 172—596 |
| 3,082,830 | 3/1963 | McKay | 172—328 |

ABRAHAM G. STONE, *Primary Examiner.*

ANTONIO F. GUIDA, *Examiner.*

F. B. HENRY, R. L. HOLLISTER, *Assistant Examiners.*